Figure 6:
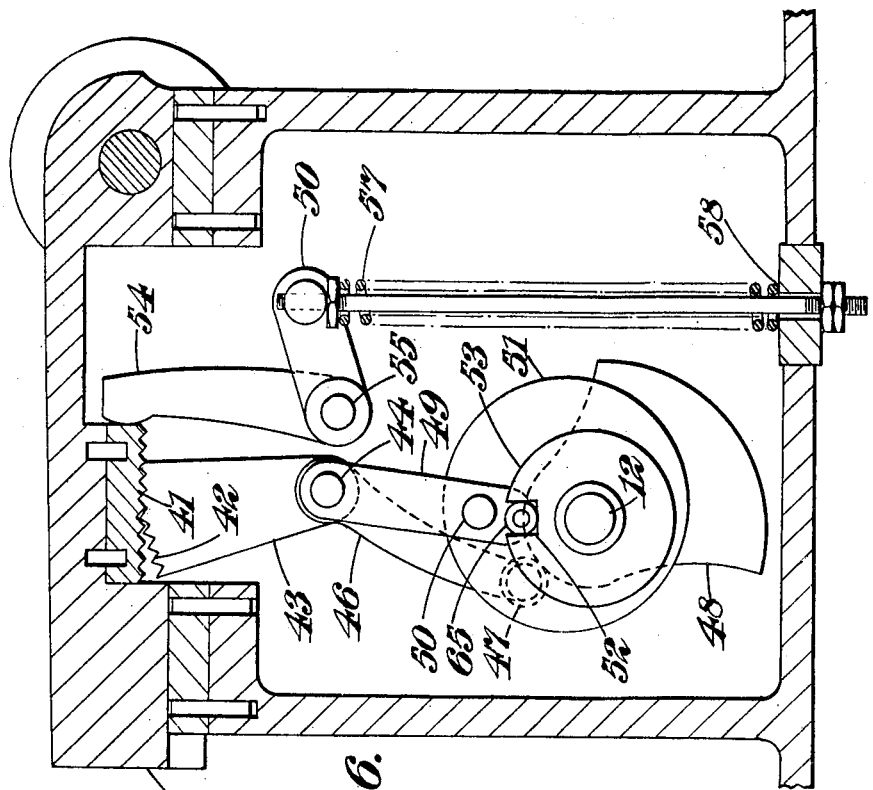

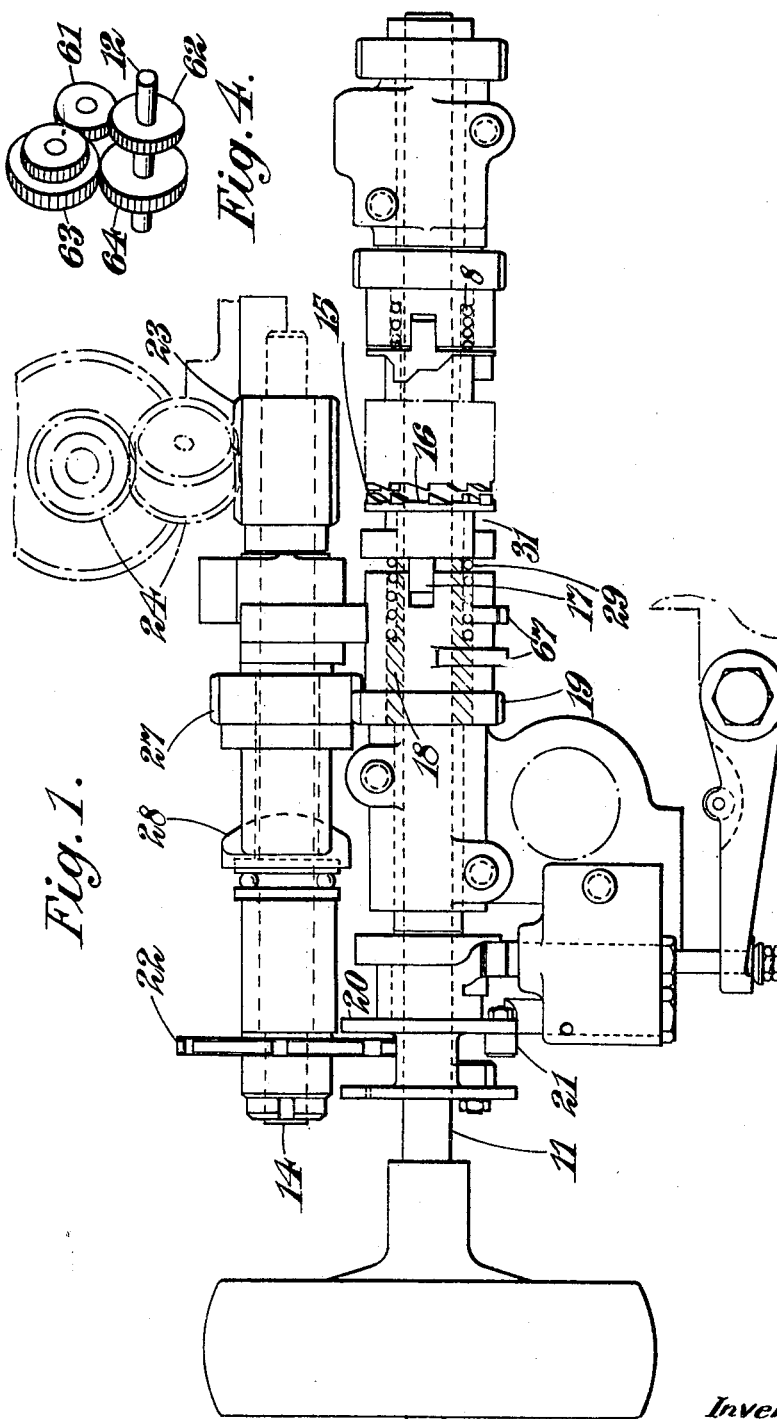

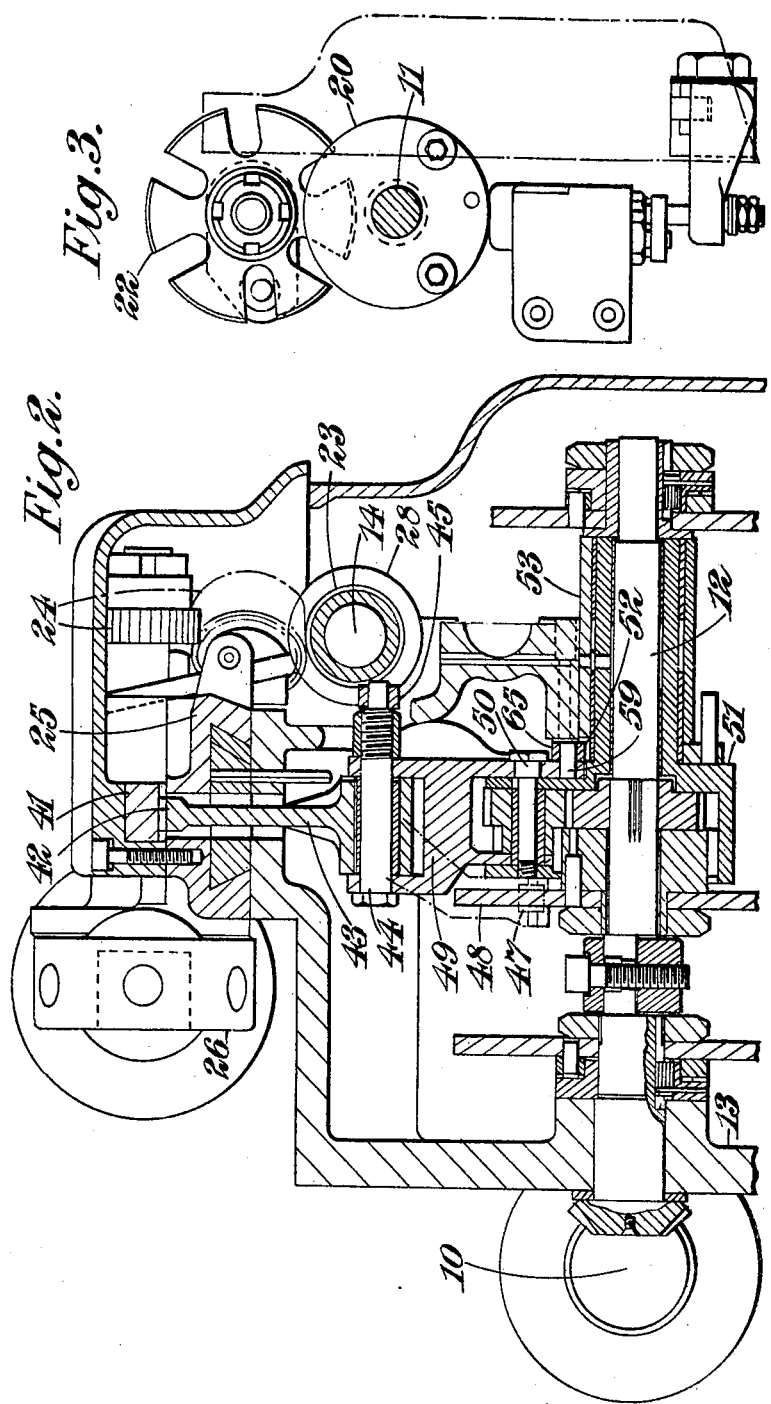

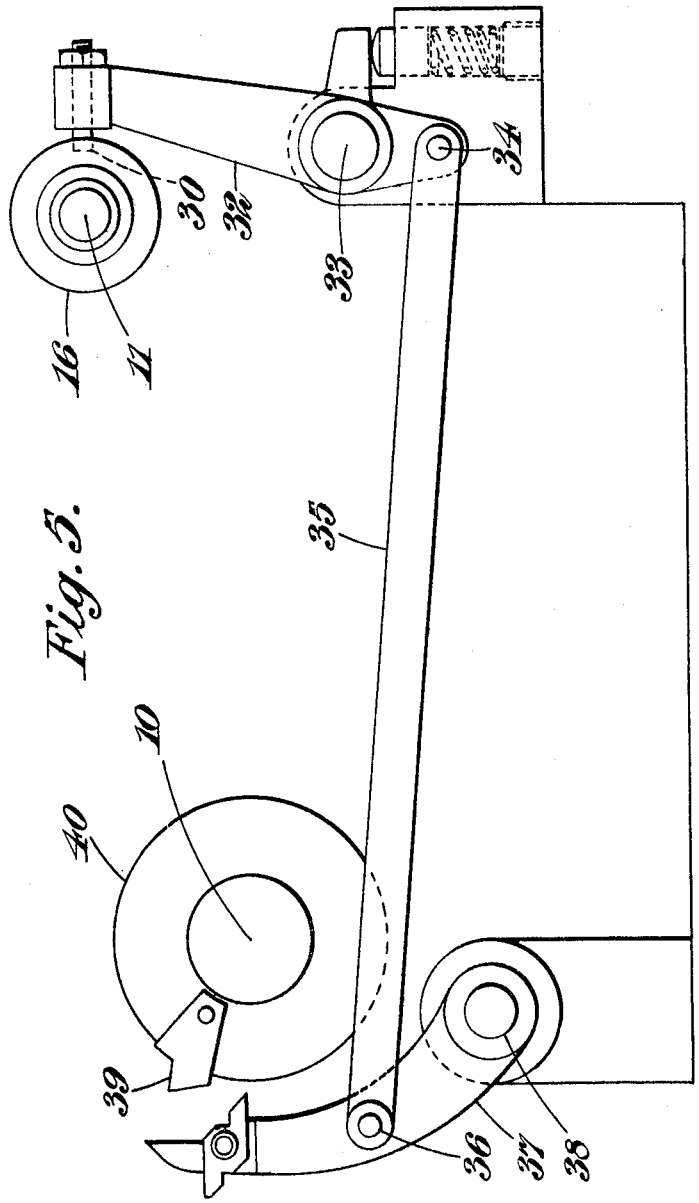

Feb. 21, 1956  W. E. R. PULMAN  2,735,161
OPERATING MECHANISM FOR RECIPROCATING TURRET
SLIDES AND INDEXING THE TURRET THEREON IN
MACHINE TOOLS
Filed May 19, 1952  4 Sheets-Sheet 4

Inventor
William Elias Reginald Pulman

United States Patent Office 2,735,161
Patented Feb. 21, 1956

2,735,161

OPERATING MECHANISM FOR RECIPROCATING TURRET SLIDES AND INDEXING THE TURRET THEREON IN MACHINE TOOLS

William Elias Reginald Pulman, Hove, England, assignor to C. V. A. Jigs, Moulds & Tools Limited, Hove, England, a British company Application May 19, 1952, Serial No. 288,588

Claims priority, application Great Britain May 18, 1951

5 Claims. (Cl. 29—44)

This invention relates to automatic machine tools and is concerned with the part of the mechanism which withdraws a turret slide clear of the work after effecting a machining operation and indexes the turret prior to the next machining operation. Heretofore, it has been usual for the turret withdrawal mechanism and the turret indexing mechanism to be driven by one and the same driving member in such a manner that the indexing mechanism comes into operation during the last part of the withdrawal movement of the turret slide. This last part of the movement of the slide is additional to that required to move the tool in the turret clear of the work, since the tool must be clear before the turret rotates. The movement of the turret slide is thus unnecessarily long as far as the withdrawal of the tool is concerned. An object of this invention is to overcome that drawback.

According to this invention a mechanism for withdrawing a turret slide and for indexing a turret in a machine tool comprises a timing shaft and two separate means controlled by said timing shaft, one for controlling the movement of the turret slide, and the other for effecting the indexing of the turret. With this arrangement, the withdrawal movement of the turret slide need only be sufficient to withdraw the tool in the turret clear of the work, whereafter the indexing of the turret takes place.

Both said means may be driven from a continuously rotating shaft through a one-revolution stop clutch controlled by said timing shaft.

The means for controlling the movement of the turret slide may comprise a continuously rotating cam mechanism or the like driven through the one revolution stop clutch and timed by said timing shaft to come into operation when the tool has to be returned along the cut so as to move the tool clear of the work, and prior to the operation of the indexing mechanism.

As is known, an adjustable mechanism may be associated with the timing shaft whereby the operation of the one-revolution stop clutch may be timed in relation to the length of the cut. The turret indexing mechanism may comprise a Geneva wheel mechanism mounted on a fixed part of the lathe and embodying a wide pinion along which slides a pinion constituting a part of the drive of the turret indexing mechanism on the turret slide.

The continuously moving cam mechanism may comprise a pivotally mounted lever arm one end of which is arranged to engage the continuously rotating cam driven from the timing shaft, and the other end of which engages a part of the turret slide, which pivotal mounting is arranged to swing around the cam and is operated upon by the over-riding cam so that the bodily swinging movement of the arm imparts withdrawal movement to the slide.

The aforesaid continuously moving cam may be rotatable on a driving shaft and is driven therefrom through an epicyclic gear, the planet carrier of which is connected to said pivotal mounting so that the swinging movement of the pivotal mounting rotates the cam on its driving shaft and maintains the correct engagement of the end of the lever arm with the cam.

In applying the invention to an automatic turret lathe having a continuous rotating back shaft, and a continuously rotating front shaft (hereinbefore referred to as the timing shaft) having a cross shaft geared thereto there is provided an auxiliary shaft driven through Geneva mechanism from a part clutchable to the back shaft which auxiliary shaft drives the indexing mechanism on the turret slide through sliding gearing and the separate and overriding cam is driven from the part clutchable to the back shaft and the clutch between that part and the back shaft is controlled by trip mechanism driven from the front shaft while the cam mechanism for moving the turret slide for a distance corresponding to the length of the cut is driven by said cross shaft.

The part clutchable to the back shaft is provided with a third cam mechanism for controlling locking mechanism for the turret indexing mechanism.

Figure 7:
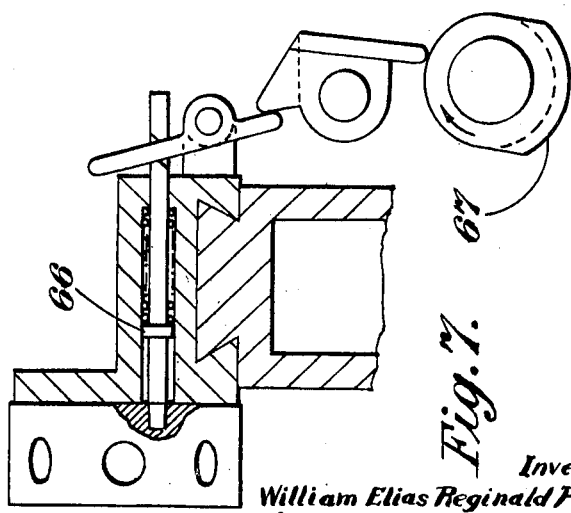

The following is a more detailed description of one form of automatic turret lathe according to the invention, reference being made to the accompanying drawing in which, Figure 1 is a front elevation of a part of the lathe showing the back shaft and intermediate shaft, Figure 2 is a cross-section of a part of the lathe showing the cross shaft, Figure 3 is a view looking from the left of Figure 1, Figure 4 is a perspective view of the epicyclic gear associated with the cam mechanism for operating the turret slide, Figure 5 is an end elevation of a part of the lathe showing the timing mechanism on the front shaft which controls the engagement of the clutch which operates the turret indexing mechanism, Figure 6 is a cross-section through the lathe showing the mechanism for operating the turret slide and Figure 7 is a cross-section through the turret slide.

The lathe comprises a continuously driven front shaft 10 or timing shaft (see Figure 2), a cross shaft 12 geared to it and a continuously driven back shaft 11 (see Figure 1) which is geared to a motor (not shown). The bearings for these shafts are all carried on a fixed portion 13 of the frame of the lathe. An intermediate shaft 14 is arranged parallel and close to the back shaft 11. The back shaft 11 has fixed to it one part 15 of a one revolution clutch, another part 16 of which clutch is slidably mounted on the back shaft and is keyed at 17 to a sleeve 18 encircling the back shaft 11. The sleeve has fixed to it a pinion 19 and has also connected to it a disc-like dog carrier 20 having a roller 21 for driving step by step a slotted Geneva wheel 22 fixed to said intermediate shaft 14. The intermediate shaft 14 has also fixed to it a long spur pinion 23 which is in slidable engagement with gearing 24 carried on the slide 25 (see Figure 2) on which the turret 26 is mounted, and which gearing is arranged to index the turret. The skew gearing 23, 24 is arranged in the manner described in U. S. patent application Serial No. 286,053 pending in Division 13. Rotatably mounted on the intermediate shaft 14 is a pinion 27 (see Figure 1) having secured to it a face cam 28 (hereinbefore referred to as the overriding cam), which pinion 27 engages with the pinion 19 on the sleeve 18 encircling the back shaft 11. As will be explained later the face cam 28 is arranged to control the withdrawal of the turret axially so that the tool clears the work. It will thus be seen that when the aforesaid clutch 15 on the back shaft 11 is engaged with the clutch part 16, not only is the face cam 28 rotated and withdraws the turret slide 25, but also the Geneva mechanism 21, 22, will be rotated one step in order to index the turret 26 at the end of the withdrawal movement of the slide. The engagement of the slidable one revolution clutch part 16 is effected by a compression spring 29, the action of which is normally resisted by a pin 30 which engages a groove 31 in the slidable part. The pin 30 is mounted at one end of a lever arm 32 (see Figure 5) pivoted at 33 to a fixed part of the device the other end of the lever arm being connected at 34 to one end of a link 35, the other end of which is connected at 36 to a trip lever pivotally mounted at 38 adjacent the front cam shaft 10. The trip lever 37 is arranged to be engaged by a nose 39 appropriately located on a disc 40 fixed to the front shaft 10, whereby the clutch is engaged at a predetermined time in the cycle of operation.

The axial movement of the turret slide is controlled in the following manner (see Figures 2 and 6). The turret slide 25 is provided with a rack 41 which is engaged by a toothed segment 42 on one end of a lever arm 43 which is mounted to swing about a spindle 44 which carries a roller 45 in engagement with the aforesaid face cam 28. The other end 46 of the lever arm (see Figure 6) is provided with another roller 47 which engages the periphery of a feed cam 48 which is continuously driven by the cross shaft 12. During the cutting stroke the aforesaid spindle 44 of the lever arm is stationary and the lever arm and the toothed segment are rocked about the spindle by reason of the continuously rotating cam 48 on said cross shaft engaging a roller 47 on the end 46 of the lever arm, thus moving the turret and its tool in a cutting direction and back again for the length of the cut. The aforesaid spindle 44 is carried by a link 49 which is pivoted at 50 to a cage 51 which may rotate about the cross shaft 12, while its lower end 59 may rock in a slot 52 in a fixed part 53 of the mechanism as hereinafter described.

The end of the rack 41 on the turret slide 25 is engaged by one end 54 of a bell crank lever or the like (see Figure 6) which is pivoted at 55 on a fixed part of the apparatus. The other end 50 of the bell crank lever is influenced by a compression spring 57 which abuts a fixed part 58 so that a force is applied to the slide in a direction to withdraw the tool axially along the work. Thus, when the aforesaid face cam 28 on the intermediate shaft 14 is rotated, the spindle 44 carrying the lever arm 43, 46 and link 49 may swing about the lower end 59 of the lever enabling the spring operated bell crank lever 54, 56 to withdraw the slide 25 and turret 26 so that the tool is clear of the work. If the feed cam 48 was fixed direct to the cross shaft 12, the movement of the spindle 44, lever arm 43, 46 and link 49 would cause the roller 47 on the lever arm to move around the cam 48 and thus the timing of the machine would be upset. In order to overcome this difficulty a mechanism is provided for rotating the cam 48 relatively to the cross shaft 12 to the same extent as the angular movement of the spindle 44 about the cross shaft 12. This is effected by means of an epicyclic gear, the planet wheels of which are mounted in the aforesaid cage 51. The aforesaid link 49 carrying the spindle 44 is pivoted to said cage 51. The planet wheel is a compound wheel, one part 61 of which is arranged to engage a pinion 62 fixed to the cross shaft 12 and the other part 63 of which is arranged to engage a pinion 64 rotatable on the cross shaft and fixed to the feed cam 48. The cage thus comprises a planet carrier. The end of the link 49 which carries the spindle 44 is provided beyond its pivotal connection 50 to the cage with a roller 65 arranged in the aforesaid slot 52 in the fixed part 53 which is a sleeve encircling the cross shaft. With this arrangement, when the spindle 44 is released by the aforesaid face cam 28 and the turret slide 25 is moved under the action of the compression spring 57, the spindle 44 moves laterally and in so doing rotates the cage 51 with the compound planet wheel 61, 63, whereby the roller 47 at the end of the lever arm and the feed cam 48 on the cross shaft 12 rotate together about the cross shaft.

During the withdrawal of the turret slide 25, a part of the gearing 24 thereon, for effecting the indexing, slides along the aforesaid wide pinion 23 on the intermediate shaft 14, which during this time is stationary. Immediately the slide has been withdrawn, the roller engages the slot in the Geneva wheel 22 and indexing is effected. A lock mechanism 66 (see Figure 7) is provided for holding the turret in the indexed position, which lock is engaged and released by a release cam mechanism 67 fixed to the sleeve which is coupled to the back shaft by the aforesaid one revolution clutch. With the above arrangement, after the clutch 16 has been engaged on the back shaft 11, the first part of the revolution of the back shaft causes the turret slide 25 to be withdrawn clear of the work under the control of the face cam, while the latter part of the revolution of the back shaft rotates the Geneva wheel 22 and indexes the turret, whereafter the lock mechanism locks the turret in the indexed position.

I claim:

1. Operating mechanism for reciprocating a turret slide in a machine tool, which mechanism comprises a continuously-rotating cam for moving the turret slide in its working movement, a lever arm, a pivotal mounting for said lever arm intermediate its ends, a cam follower at one end of the lever arm engaging said cam, connecting means at the other end of the lever arm providing a driving connection with the turret slide, means for moving said pivotal mounting and thereby the end of the lever arm connected with the turret slide in a direction such that the turret slide moves away from the work, and timing means operating said means for moving said pivotal mounting in timed relationship with the operation of said continuously-rotating cam.

2. Operating mechanism as claimed in claim 1 in which said means for moving said pivotal mounting comprise a cam acting on the pivotal mounting.

3. Operating mechanism as claimed in claim 1 in which there are provided a driving shaft having said continuously-rotating cam rotatably mounted thereon, an epicyclic gear affording a driving connection between the driving shaft and the continuously-rotating cam, and a planet carrier for the epicyclic gear, which planet carrier is connected to the aforesaid pivotal mounting whereby said movement of the pivotal mounting rotates the continuously-rotating cam on its driving shaft and maintains the correct engagement of the cam follower with the cam.

4. In a machine tool having operating mechanism for reciprocating a turret slide as claimed in claim 1 and having indexing means for indexing a turret on the turret slide, means actuating said indexing means after completion of the movement of the turret slide away from the work.

5. In a machine tool having operating mechanism for reciprocating a turret slide as claimed in claim 1 and having indexing means for indexing a turret on the turret slide, a continuously-rotating driving shaft, a transmission between said driving shaft and the indexing means and the aforesaid means for moving said pivotal mounting, a clutch in said transmission, operating means for the clutch, a continuously-rotating timing shaft for actuating said operating means, and a transmission between the timing shaft and said continuously-rotating cam, said timing shaft and operating means for the clutch providing the aforesaid timing means and the first-said transmission actuating said means for moving said pivotal mounting and the indexing means consecutively and separately.

References Cited in the file of this patent
UNITED STATES PATENTS

| | | |
|---|---|---|
| 554,812 | Clyne | Feb. 18, 1896 |
| 2,291,382 | Duglin | July 28, 1942 |
| 2,484,874 | Brown | Oct. 18, 1949 |
| 2,616,159 | Curtis | Nov. 4, 1952 |